(No Model.)

T. R. ALMOND.
REAMER.

No. 376,501. Patented Jan. 17, 1888.

WITNESSES:
Gustave Dieterich
T. F. Bourne

INVENTOR
Thomas R. Almond
BY Briesen & Steel
ATTORNEYS

UNITED STATES PATENT OFFICE.

THOMAS R. ALMOND, OF NEW YORK, N. Y.

REAMER.

SPECIFICATION forming part of Letters Patent No. 376,501, dated January 17, 1888.

Application filed December 10, 1887. Serial No. 257,523. (No model.)

*To all whom it may concern:*

Be it known that I, THOMAS R. ALMOND, a resident of the city, county, and State of New York, have invented an Improved Reamer, of which the following is a specification.

This invention relates to improvements in the reamer for which I obtained Letters Patent No. 351,482, dated October 26, 1886. In said patent the reamer is provided with an adjustable blade by which the diameter of the reamer can be enlarged. This adjustable blade acts in conjunction with fixed cutting-blades carried by the reamer; but this adjustable blade is liable to wear away when used as a cutting-blade, and thus the diameter of the reamer, notwithstanding the adjustability of this blade, will be reduced after a certain length of time.

It is the object of this invention to provide the reamer with an adjustable blade which will not act as a cutting-blade, and will therefore retain the reamer in the desired adjustment.

To this end I provide the reamer having fixed cutting-blades with an adjustable blade having a curved outer edge, the curve being part of a circle of which the axis of the reamer is the center. Such a blade will serve to press the fixed cutting-blades opposite to it against the opposite wall of the hole, will readily travel around the inner wall of the hole to be reamed, but will not cut the same, and will therefore not be worn away, the fixed blades only performing the work of cutting. This cylindrical adjustable blade can be manipulated the same as the adjustable blade shown in said Patent No. 351,482.

Another part of the invention relates to the position of the rib on said adjustable blade.

Reference is to be had to the accompanying drawings, forming part of this specification, in which—

Figure 1:
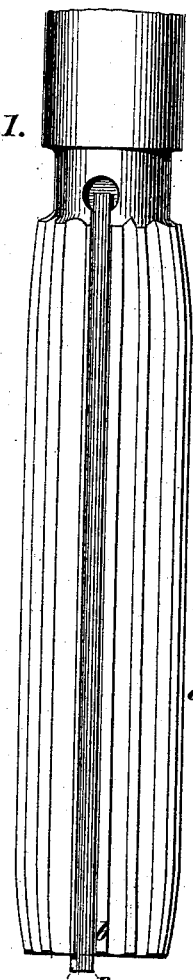
Figure 2:
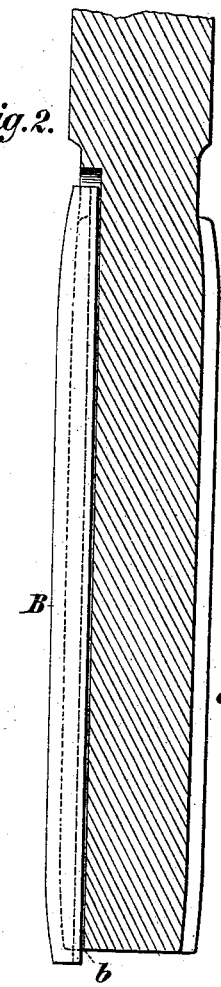
Figure 3:
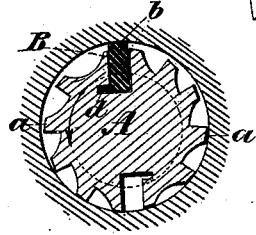
Figure 4:
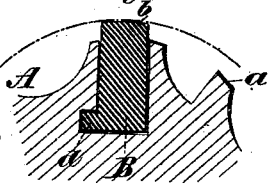

Figure 1 is a side view of my improved reamer. Fig. 2 is a longitudinal central section of the same. Fig. 3 is a cross-section of the same, and Fig. 4 is a detail cross-section on an exaggerated scale.

In the drawings, the letter A represents the reamer, which, except the arrangement of the adjustable blade, is of the construction described in my Patent No. 351,482—that is, it is provided with a series of fixed cutting blades or ribs, *a*, and may also have any desired taper. Into the face of this reamer A is set, as shown, an adjustable blade, B, which, preferably, has the length of the reamer. The outer edge, *b*, of the blade B is curved, the curve being part of a circle of which the center of the reamer forms approximately the center. In other words, the blade B is part of a cylinder. This blade B has on the side toward which it is turned with the reamer a projecting rib, *d*, which enters a corresponding groove in the body of the reamer, for the purpose of holding the blade in place and guiding it while it is undergoing adjustment. By having this rib *d* on the side of the blade toward which said blade is turned, instead of on the opposite side, as in my said former patent, I hold the blade more securely from tilting. When the reamer is in the hole to be reamed, the cylindrical edge *b* of the adjustable blade B will bear against the inner wall of the hole, and will therefore press the fixed cutters *a*, which are substantially opposite it, against the opposite side of the hole. When the reamer is turned in the direction of the arrow, Fig. 3, the rounded blade B will slip in the hole, but will not be pressed to cut into the metal. This will be clearly understood by reference to Fig. 3. As the fixed cutters *a* wear away, the blade B can be adjusted still farther from the true center of the reamer to produce the required diameter of hole in manner similar to the blade shown in said Patent No. 351,482.

Instead of having only one recess to receive the adjustable rounded blade B, the reamer may be provided with two or more recesses, so that all the fixed cutters *a* may be in turn made to cut.

Another advantage of using the broad adjustable blade is that it acts to steady the reamer in the hole and prevents its tilting therein.

Having now described my invention, what I claim is—

1. The fluted reamer A, having stationary blades *a*, and adjustable blade B, said adjustable blade having curved outer edge, substantially as specified.

2. The combination of the reamer A with its adjusting-blade B and with the rib *d* thereon, said rib being on that side of said blade toward which the same is turned during the operation of the reamer, as specified.

THOS. R. ALMOND.

Witnesses:
HARRY M. TURK,
T. F. BOURNE.